Patented June 14, 1949

2,473,339

UNITED STATES PATENT OFFICE 2,473,339

STABLE, STERILE AQUEOUS SOLUTIONS OF STREPTOMYCIN AND PROCESS OF MAKING SAME

Frederick J. Kirchmeyer, Waukegan, and Ione Rita Card, North Chicago, Ill., assignors to Abbott Laboratories, a corporation of Illinois No Drawing. Application June 13, 1946, Serial No. 676,572

10 Claims. (Cl. 21—2)

Our invention relates to anti-biotic agents and includes among its objects and advantages improvements in the production of stable liquid preparations, along lines particularly applicable to streptomycin.

The antibiotic agent, streptomycin, and its production by the growth of an appropriate mold, is known in the art, and, per se, forms no part of the present invention. It has also become known that salts of streptomycin containing less than 1% moisture can be preserved, with proper precautions, at room temperatures for extended periods, at least up to one year, with no material loss in potency. However, prior to the present invention it was generally known that it was impossible to autoclave solutions of streptomycin and that such solutions were injured by temperatures materially above 75° Fahrenheit. Such information about the instability of streptomycin solutions has been reported in the literature. According to the invention it has been possible to prepare solutions of streptomycin and autoclave them without injury and to preserve them for considerable periods of time without appreciable loss of potency. Previous solutions were, in general, also susceptible to discoloration by decomposition of an unknown nature, which, in some instances, may result in material darkening. The procedures of the invention have resulted in considerable improvement in this respect also.

The best results secured so far have been with solutions maintained between pH values of about 3.0 and about 6.0 and preferably between about 3.68 and about 5.5 with the optimum results at about 4.85. It has been found possible to make up solutions of streptomycin salts at the pH value stated, the solutions being made up under an inert atmosphere of nitrogen and containing protective ingredients, in the nature of relatively mild reducing agents of which sodium metabisulfite and sodium formaldehyde sulfoxylate have given best results so far. At pH values of 4.85 the metabisulfite appears to be somewhat more effective than the sulfoxylate and at higher and lower pH values the discrepancy is still greater in favor of the metabisulfite, although effective results can be secured with sulfoxylate.

Suitable alkaline radicals include alkali and alkaline earth metals, ammonia, organic amines, and heterocyclic groups including nitrogen, such as sodium, potassium, calcium, ethylamine, benzylamine, pyridine, piperidine and so forth. Among the acid radicals, bisulfite and sulfoxylate have given best results so far and thiosulfates, hypophosphites and bitartrates also appear to be effective.

Example I

A solution of streptomycin sulfate having concentration of 10,000 units per cubic centimeter was made up under protection by an inert atmosphere of nitrogen and contained $\frac{1}{10}$% sodium metabisulfite at a pH of 3.68. The ampouled solution thus prepared was autoclaved for 30 minutes at 10 pounds pressure (240° F.) without any loss in potency. After three months storage in an incubator at 105° Fahrenheit it assayed 92.5% of its original potency and after five months it assayed 87.4%.

Example II

A solution of streptomycin sulfate was made up with nitrogen protection with a pH of 5.5. The concentration was 10,000 units per c. c. and the protective ingredients included $\frac{1}{10}$% of sodium metabisulfite 1.9% sodium lacate. The ampouled solution showed no loss on autoclaving and after three months in an incubator at 105° F. it assayed 100.0% of its original potency. Comparisons between this and a large number of other tests appear to indicate that no benefit is secured by including lacate ion in the solution.

Example III

A solution of streptomycin sulfate of concentration 10,000 units per c. c. was made up at a pH of 6.0 under nitrogen protection and with $\frac{1}{10}$% sodium metabisulfite. The ampouled solution showed no loss on autoclaving and after one month in the incubator at 105° F. it assayed 98.2% of its original potency.

Example IV

A solution identical with that of Example III but with a pH of 4.85 showed no loss on autoclaving and after two months incubation at 105° F. assayed 98.8% of its original potency.

Example V

A solution of streptomycin sulfate concentration 10,000 units per c. c. was made up under nitrogen protection with a pH of 4.85 and $\frac{1}{10}$% sodium metabisulfite and 7.35% sodium citrate. After two months incubation at 105° F. it assayed 83.6% of its original potency.

Example VI

A solution of streptomycin sulfate concentration 10,000 units per c. c. was made up under nitrogen protection with a pH 4.85 and $\frac{1}{10}$% sodium formaldehyde sulfoxylate and 7.35% sodium citrate. After two months incubation at 105° F. it assayed 93% of its original potency. Comparison of this with many other experiments indicates that apparently the citrate ion does not exert any specific protective action.

In all the foregoing examples the stated potency is a comparison between the potency of the original solution before autoclaving and the final product after autoclaving and subsequent storage, so that the loss in potency represents the combined effects of both the autoclaving and the storage.

Comparison between the examples given and other successful and unsuccessful tests indicate further that an inert atmosphere of carbon dioxide is inferior to one of nitrogen; that sodium phosphate is an effective buffer for pH control but causes the potency to decrease seriously either with or without inert atmosphere protection.

Experiments with a concentation of 100,000 and 200,000 units per c. c. indicate that the highly concentrated solutions are substantially equally amenable to protection according to the invention. In the examples, bisulfite has been given in terms of sodium metabisulfite because that was the form employed in making up the various preparations. We are not aware that this procedure differs in any way from the use of other forms of bisulfite.

Optimum results have been obtained by the conjoint use of three factors, accurate pH adjustment and control, preparation under a suitable inert atmosphere, and a protective ingredient of the type exemplified by sodium metabisulfite and the other protective substances above listed. Up to the present time, absence, or serious deficiency, in any one of these factors has impaired the results obtainable. Lactates and citrates appear to result in no improvement, but neither do they seem to do any harm. Therefore, they could be safely included, if other circumstances rendered their presence advisable.

Others may readily adapt the invention for use under various conditions of service by employing the novel features disclosed or equivalents thereof. As at present advised with respect to the present scope of our invention, we desire to claim the following subject matter.

We claim:

1. The method of preparing streptomycin solutions stable in storage for long periods of time up to several months, which comprises: dissolving streptomycin material in water; adding as a protective ingredient a small amount of a soluble water-stable bisulfite salt; adjusting the pH to between about 3.0 and about 6.0; placing the solution in sealed containers; sterilizing the sealed containers by exposure to heat to a temperature above the boiling point of the solution; and performing all the operations beginning with dissolving and ending with sealing the containers, under an inert atmosphere.

2. The method of preparing streptomycin solutions stable in storage for long periods of time up to several months, which comprises: dissolving solid streptomycin material in water; adding as a protective ingredient a small amount of an alkali metal bisulfite salt; adjusting the pH to about 4.85 and between about 3.0 and about 6.0; placing the solution in sealed containers; sterilizing the sealed containers by exposure to heat about equivalent to a temperature of 240° F. for 30 minutes; and performing all the operations beginning with dissolving and ending with sealing the containers, under an inert atmosphere.

3. The method of stabilizing streptomycin solutions which comprises; dissolving a streptomycin salt in water; adjusting the pH to about 4.85 and between about 3.0 and 6.0; placing the solution in sealed containers; sterilizing the sealed containers by exposure to heat about equivalent to a temperature of 240° F. for 30 minutes; performing all the operations beginning with dissolving and ending with sealing the containers, under an inert atmosphere; and preventing injury to the streptomycin during sterilizing by adding a protective salt having a mild reducing action before sterilizing.

4. The method of stabilizing streptomycin solutions which comprises; dissolving a streptomycin salt in water; adding as a protective ingredient a small amount of sodium metabisulfite; adjusting the pH to about 4.85 and between about 3.0 and about 6.0; placing the solution in sealed containers; sterilizing the sealed containers by exposure to heat about equivalent to a temperature of 240° F. for 30 minutes; and performing all the operations beginning with dissolving and ending with sealing the containers, in an inert atmosphere.

5. The method of stabilizing streptomycin solutions which comprises; dissolving a streptomycin salt in water; adding as a protective ingredient a small amount of sodium formaldehyde sulfoxylate; adjusting the pH to about 4.85 and between about 3.0 and about 6.0; placing the solution in sealed containers; sterilizing the sealed containers by exposure to heat about equivalent to a temperature of 240° F. for 30 minutes; and performing all the operations beginning with dissolving and ending with sealing the containers, in an inert atmosphere.

6. A stable liquid streptomycin preparation comprising, in combination: a sterile aqueous solvent; and a sterile sulphate salt of streptomycin dissolved in said solvent; said solvent also containing as a protective ingredient a small amount of sodium metabisulfite, and sufficient acidic material to maintain the pH during storage in an inert atmosphere at about 4.85 and between about 3.0 and about 6.0.

7. A stable liquid streptomycin preparation comprising, in combination: a sterile aqueous solvent; and a sterile salt of streptomycin dissolved in said solvent; said solvent also containing as a protective ingredient a salt stable in aqueous solution and having a mild reducing action; and sufficient acidic material to maintain the pH during storage in an inert atmosphere at about 4.85 and between about 3.0 and about 6.0.

8. The method of preparing streptomycin solutions stable in storage for periods of time up to several months, which comprises: dissolving streptomycin material in water; adding as a protective ingredient a small amount of a soluble water-stable salt having a mild reducing action; adjusting the pH to about 3.0 to 6.0; placing the solution in sealed containers; sterilizing the sealed containers by exposure to heat to a temperature above the boiling point of the solution; and performing all of the operations beginning with the dissolving and ending with sealing the containers, under an inert atmosphere.

9. The method of preparing streptomycin solutions stable in storage for long periods of time up to several months, which comprises: dissolving streptomycin material in water; adding as a protective ingredient a small amount of a soluble water-stable formaldehyde sulfoxylate salt; adjusting the pH to between about 3.0 and about 6.0; placing the solution in sealed containers; sterilizing the sealed containers by exposure to heat to a temperature above the boiling point of the solution; and performing all the operations beginning with dissolving and ending with sealing the containers, under an inert atmosphere of nitrogen.

10. The method of preparing streptomycin solutions stable in storage for long periods of time up to several months, which comprises: dissolving solid streptomycin material in water; adding as a protective ingredient a small amount of an alkali metal formaldehyde sulfoxylate salt; adjusting the pH to about 4.85 and between about 3.0 and about 6.0; placing the solution in sealed containers; sterilizing the sealed containers by exposure to heat about equivalent to a temperature of 240° F. for 30 minutes; and performing all the operations beginning with dissolving and ending with sealing the containers, under an inert atmosphere.

FREDERICK J. KIRCHMEYER.
IONE RITA CARD.

REFERENCES CITED

The following references are of record in the file of this patent:

Waksman, J. Amer. Pharm. Assoc., Scientific Edition, Nov. 1945, page 279.

Science, Mar. 29, 1946, pages 399 to 401.